Patented Sept. 6, 1949

2,481,417

UNITED STATES PATENT OFFICE 2,481,417

PREPARATION OF PHENOLPHTHALEIN BETA,BETA'-DIGLUCOSIDE OCTAACETATE

Ralph A. Hales, West Chester, Pa., assignor to Atlas Powder Company, Wilmington, Del., a corporation of Delaware No Drawing. Application August 30, 1946, Serial No. 694,153

5 Claims. (Cl. 260—211)

The present invention relates to the manufacture of phenolphthalein beta,beta'-diglucoside octaacetate.

An object of the invention is the production of phenolphthalein beta,beta'-diglucoside octaacetate in high yield.

Another object of the invention is the acceleration of the rate of condensation of phenolphthalein with tetraacetylglucosyl bromide.

Other objects will be apparent from the following description.

Phenolphthalein beta,beta'-diglucoside octaacetate has been prepared by coupling tetraacetylglucosyl bromide and phenolphthalein in the presence of silver oxide and quinoline as catalysts. The reaction may be represented by the following equation:

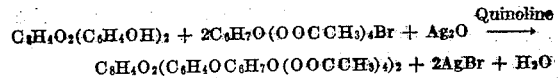

This reaction, however, has been found to be erratic and unreliable in yield. Yields in different batches have often varied from as low as about 15% of theoretical to as high as about 50% of theoretical for no apparent reason.

It has now been determined that these erratic results in yields have been due to the quinoline used. Some samples of quinoline seem to be much more active than others in promoting the coupling reaction. The nature of the difference between active and less active quinoline is not known, nor it is known how the active quinoline may be distinguished from the less active quinoline except by using it in the reaction.

According to the present invention it has been discovered that quinoline may be promoted by the addition to the reaction of some aliphatic amines and that when quinoline is promoted in this manner much more uniform results are obtained. Yields are usually improved over those obtainable when even the most active quinoline is employed alone, and fluctuations in yields due to variations in quinoline are substantially eliminated.

It has also been found that quinaldine, isoquinoline, or lepidine may be substituted for quinoline in the reaction, particularly when they are promoted in the same manner.

The preferred promoter materials are ethylamine, triethylamine, ethylene diamine, monoethanolamine, monoisopropanolamine, and hydroxyethylethylene diamine. While these materials do not all produce exactly equivalent results, they are all effective to improve the reaction as stated above.

In the performance of the reaction tetraacetylglucosyl bromide, phenolphthalein and the catalytic ingredients are mixed with a solvent for at least one of the reactants. Benzene, monochlorbenzene, and chloroform are examples of suitable solvents. After the reactants are brought together the reaction takes place spontaneously. Heating the reaction mixture speeds the reaction, but temperatures much above 50° C. usually tend to lower the yield. Temperatures of about 40° C. have been found desirable for practical operation of the process, but it is usually preferred that temperatures as high as this not be maintained much longer than about six hours. The completion of the reaction may usually be determined by the absence of soluble bromide in the reaction mixture.

The phenolphthalein beta,beta'-diglucoside octaacetate product may be recovered from the reacted mixture and purified in any convenient manner. One useful method includes filtering the insoluble material, chiefly silver bromide and unreacted silver oxide, from the reaction mixture, removing the solvent by vacuum distillation, digesting the product at elevated temperatures with ethyl alcohol, crystallizing by cooling and stirring, and finally filtering and drying.

Silver oxide operates not only as a catalyst but also as a reactant, since it is converted into silver bromide in the process. Silver carbonate may be substituted for silver oxide in the reaction, but loss in yield is sometimes noted when this substitution is made.

The amounts of reacting ingredients may be subject to considerable variation, but it is usually preferred that the silver catalyst be employed in slight excess. The reaction is generally assisted if enough solvent is used to keep the reaction mass in thinly fluid condition. The amount of organic catalyst (primary or quinoline type and the promoter type) is also subject to variation both as to total quantity and as to relative proportions. Usually the optimum amounts will vary somewhat with the particular materials employed. In general the total amount of organic catalyst ingredients will not exceed about 50% by weight of the tetraacetylglucosyl bromide employed.

The reaction time is usually shortened by increasing the amount of organic catalyst beyond the minimum amount necessary for maximum yield. However, an unduly large increase in the quantity of promoter material may result in a decrease in yield, an increase in the reaction time or both.

The invention will be further described by means of the following specific examples:

In each of these examples 9.7 grams of phenolphthalein, 15 grams of silver oxide, 30 cubic centimeters of benzene, and the organic catalyst were mixed at 25° C. and then a solution of 25 grams of crystalline tetraacetylglucosyl bromide in 30 cubic centimeters of benzene was added uniformly in a period of 10 minutes with stirring. The mixture was then agitated first at a temperature of 25° C. for one hour and then at a temperature of 40° C. until a negative test for soluble bromide was obtained, or if a negative test for soluble bromide was not obtained after some four to six hours at 40° C. the reaction was continued at 25° C. with stirring until it was completed, or for about sixteen hours more.

To recover and purify the phenolphthalein beta,beta'-diglucoside octaacetate, the insoluble material, chiefly silver bromide and excess silver oxide, was then removed by filtration, the filter cake was washed with benzene, and the solvent was essentially removed from the filtrate and wash liquor by vacuum distillation at 65°. C. The residue was digested with 100 cubic centimeters of hot denatured ethyl alcohol, cooled, and then stirred for two days at 30° C. The resultant crystalline solid phenolphthalein beta,-beta'-diglucoside octaacetate was then removed by filtration, washed with alcohol, again digested with 350 cubic centimeters of hot denatured ethyl alcohol, cooled, and stirred for two days at 30° C. The resulting crystalline material was filtered, washed with ethyl alcohol, and dried at 110° C. This same recovery and purification procedure was also used in the succeeding examples.

The quinoline employed in these examples could be classed as fairly inactive.

and another catalyst comprising a substance selected from the group consisting of quinoline, isoquinoline, and quinaldine, said other catalyst further including an added substance selected from the group consisting of ethylamine, triethylamine, ethylenediamine, monoethanolamine, monoisopropanolamine, and hydroxyethylethylene diamine.

2. In a process for the preparation of phenolphthalein beta,beta'-diglucoside octaacetate by the reaction of phenolphthalein and tetraacetylglucosyl bromide in a solvent, the improvement which comprises performing the reaction in the presence of catalytic ingredients comprising silver oxide, quinoline and an added substance selected from the group consisting of ethylamine, triethylamine, ethylenediamine, monoethanolamine, monoisopropanolamine and hydroxyethylethylene diamine.

3. In a process for the preparation of phenolphthalein beta,beta'-diglucoside octaacetate by the reaction of phenolphthalein and tetraacetylglucosyl bromide in a solvent the improvement which comprises performing the reaction in the presence of silver oxide, quinoline, and ethylene diamine.

4. In a process for the preparation of phenolphthalein beta,beta'-diglucoside octaacetate by the reaction of phenolphthalein and tetraacetylglucosyl bromide in a solvent the improvement which comprises performing the reaction in the presence of silver oxide, quinoline and monoisopropanolamine.

5. In a process for the preparation of phenolphthalein beta,beta'-diglucoside octaacetate by the reaction of phenolphthalein and tetraacetylglucosyl bromide in a solvent the improvement which comprises performing the reaction in the presence of silver oxide, quinoline, and hydroxyethylethylene diamine.

RALPH A. HALES.

| Example | Primary Organic Catalyst | | Organic Promoter Catalyst | | Yield of Phenolphthalein beta,-beta'-diglucoside octaacetate (Per Cent of Theory) | Time of Reaction (hours) |
|---|---|---|---|---|---|---|
| | Kind | Amount (cc.) | Kind | Amount (cc.) | | |
| 1 | Quinoline | 3.7 | None | | 34.2 | Between 6.5 and 22.5. |
| 2 | do | 7.5 | do | | 41.3 | between 7 and 23. |
| 3 | do | 3.7 | ethylamine | 0.25 | 51.8 | 6. |
| 4 | do | 3.7 | triethylamine | 0.25 | 51.2 | between 7 and 23. |
| 5 | do | 3.7 | ethylene diamine | 0.12 | 47.5 | between 6.5 and 22.5. |
| 6 | do | 3.7 | do | 0.25 | 67.1 | between 6 and 22. |
| 7 | do | 7.5 | do | 0.25 | 68.2 | 3.5. |
| 8 | do | 3.7 | do | 1.25 | 45.5 | not completed in 22.5 hrs. |
| 9 | do | 3.7 | monoethanolamine | 0.25 | 54.4 | 5. |
| 10 | do | 3.7 | monoisopropanolamine | 0.12 | 41.1 | 6.5. |
| 11 | do | 3.7 | do | 0.25 | 68.1 | 5. |
| 12 | do | 7.5 | do | 0.25 | 66.4 | 3.5. |
| 13 | do | 3.7 | do | 1.25 | 60.7 | 5. |
| 14 | do | 3.7 | hydroxyethylethylenediamine | 0.12 | 49.4 | 6.5. |
| 15 | do | 3.7 | do | 0.25 | 67.5 | 5. |
| 16 | do | 7.5 | do | 0.25 | 67.0 | 3.5. |
| 17 | do | 3.7 | do | 1.25 | 11.5 | between 6.5 and 22.5. |
| 18 | Isoquinoline | 7.5 | None | | 48.2 | 3. |
| 19 | do | 7.5 | hydroxyethylethylenediamine | 0.50 | 57.3 | 2. |
| 20 | Quinaldine | 7.5 | None | | 49.4 | 5.5. |
| 21 | do | 7.5 | hydroxyethylethylenediamine | 0.50 | 59.8 | 5.5. |

What is claimed is:

1. In a process for the preparation of phenolphthalein beta,beta'-diglucoside octaacetate by the reaction of phenolphthalein and tetraacetylglucosyl bromide in a solvent, the improvement which comprises performing the reaction in the presence of a catalyst selected from the class consisting of silver oxide and silver carbonate

REFERENCES CITED

The following references are of record in the file of this patent:

UNITED STATES PATENTS

| Number | Name | Date |
|---|---|---|
| 2,216,734 | Cairncross | Oct. 8, 1940 |